US008700690B2

(12) United States Patent
Raghav et al.

(10) Patent No.: US 8,700,690 B2
(45) Date of Patent: Apr. 15, 2014

(54) AGGREGATING USER PRESENCE ACROSS MULTIPLE ENDPOINTS

(75) Inventors: Amritansh Raghav, Seattle, WA (US); Ankur Chavda, Seattle, WA (US); Eran Shtiegman, Redmond, WA (US); Setty Venkateshaiah, Bellevue, WA (US); Sira P. Rao, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 283 days.

(21) Appl. No.: 13/082,350

(22) Filed: Apr. 7, 2011

(65) Prior Publication Data

US 2011/0185006 A1    Jul. 28, 2011

Related U.S. Application Data

(63) Continuation of application No. 11/392,472, filed on Mar. 28, 2006, now Pat. No. 7,945,612.

(51) Int. Cl.
*G06F 15/16* (2006.01)

(52) U.S. Cl.
USPC ........... 709/201; 709/202; 709/203; 709/205; 709/207

(58) Field of Classification Search
None
See application file for complete search history.

(56) References Cited

U.S. PATENT DOCUMENTS

| 4,471,348 | A | 9/1984 | London et al. |
| 5,964,839 | A | 10/1999 | Johnson et al. |
| 6,012,030 | A | 1/2000 | French-St. George et al. |
| 6,148,328 | A | 11/2000 | Cuomo et al. |
| 6,189,008 | B1 | 2/2001 | Easty et al. |
| 6,236,399 | B1 | 5/2001 | Nishiyama et al. |
| 6,301,609 | B1 | 10/2001 | Aravamudan et al. |
| 6,304,893 | B1 | 10/2001 | Gish |
| 6,424,354 | B1 | 7/2002 | Matheny et al. |
| 6,527,641 | B1 | 3/2003 | Sinclair et al. |
| 6,539,347 | B1 | 3/2003 | Paterson et al. |
| 6,658,095 | B1 | 12/2003 | Yoakum et al. |
| 6,671,714 | B1 | 12/2003 | Weyer et al. |
| 6,678,719 | B1 | 1/2004 | Stimmel |

(Continued)

FOREIGN PATENT DOCUMENTS

| EP | 1079318 A2 | 2/2001 |
| WO | WO-01/45368 A2 | 6/2001 |

OTHER PUBLICATIONS

U.S. Appl. No. 11/419,947, Chavda et al.

(Continued)

*Primary Examiner* — Thomas Dailey
*Assistant Examiner* — Nam Tran
(74) *Attorney, Agent, or Firm* — Sonia Cooper; Jim Ross; Micky Minhas

(57) ABSTRACT

A presence aggregation system provides a presence server that allows users to publish information regarding their availability with the presence server. The presence server maintains a record of each user's published information. When an endpoint publishes information regarding a user's availability at that endpoint with the presence server, the presence server provides all of the user's published information, including the information just published, to each of the user's endpoints, including the endpoint which published the information. This allows each of the user's endpoints to generate an aggregated availability of the user. The presence server may also provide all of the user's published information, including the information just published, to each of the subscribing users' endpoints. This allows the subscribing users to also generate a view of the user's aggregated availability.

16 Claims, 15 Drawing Sheets

(56) References Cited

U.S. PATENT DOCUMENTS

| | | | |
|---|---|---|---|
| 6,697,840 | B1 | 2/2004 | Godefroid et al. |
| 6,757,722 | B2 | 6/2004 | Lonnfors et al. |
| 6,774,921 | B1 | 8/2004 | Tadman et al. |
| 6,874,125 | B1 | 3/2005 | Carroll et al. |
| 6,970,547 | B2 | 11/2005 | Andrews et al. |
| 7,035,923 | B1 | 4/2006 | Yoakum et al. |
| 7,376,227 | B2 | 5/2008 | Anisimov et al. |
| 7,466,810 | B1 * | 12/2008 | Quon et al. ............... 709/201 |
| 7,945,612 | B2 | 5/2011 | Raghav et al. |
| 2002/0065802 | A1 | 5/2002 | Uchiyama |
| 2002/0065894 | A1 | 5/2002 | Dalal et al. |
| 2002/0116461 | A1 | 8/2002 | Diacakis et al. |
| 2002/0188441 | A1 | 12/2002 | Matheson et al. |
| 2003/0009530 | A1 | 1/2003 | Philonenko et al. |
| 2003/0184594 | A1 | 10/2003 | Ellenby et al. |
| 2003/0208541 | A1 | 11/2003 | Musa |
| 2003/0217098 | A1 | 11/2003 | Bobde et al. |
| 2003/0217099 | A1 | 11/2003 | Bobde et al. |
| 2003/0217142 | A1 * | 11/2003 | Bobde et al. ............. 709/224 |
| 2004/0010573 | A1 | 1/2004 | Debaty et al. |
| 2004/0059781 | A1 | 3/2004 | Yoakum et al. |
| 2004/0078443 | A1 | 4/2004 | Malik |
| 2004/0078444 | A1 | 4/2004 | Malik |
| 2004/0088649 | A1 | 5/2004 | Elder et al. |
| 2004/0148347 | A1 | 7/2004 | Appelman et al. |
| 2004/0161090 | A1 | 8/2004 | Digate et al. |
| 2004/0162881 | A1 | 8/2004 | Digate et al. |
| 2004/0172481 | A1 | 9/2004 | Engstrom |
| 2004/0205134 | A1 | 10/2004 | Digate et al. |
| 2004/0225901 | A1 | 11/2004 | Bear et al. |
| 2004/0230594 | A1 | 11/2004 | Flam et al. |
| 2004/0247089 | A1 | 12/2004 | Vishik et al. |
| 2005/0044143 | A1 | 2/2005 | Zimmermann et al. |
| 2005/0068167 | A1 | 3/2005 | Boyer et al. |
| 2005/0071773 | A1 | 3/2005 | Ivanovic et al. |
| 2005/0108328 | A1 | 5/2005 | Berkeland et al. |
| 2005/0198321 | A1 * | 9/2005 | Blohm ................. 709/205 |
| 2005/0232184 | A1 | 10/2005 | Borella |
| 2006/0004837 | A1 | 1/2006 | Genovker et al. |
| 2006/0004911 | A1 | 1/2006 | Becker et al. |
| 2006/0015609 | A1 | 1/2006 | Hagale et al. |
| 2006/0031293 | A1 | 2/2006 | Thommes et al. |
| 2006/0069686 | A1 | 3/2006 | Beyda et al. |
| 2006/0288099 | A1 | 12/2006 | Jefferson et al. |
| 2007/0027917 | A1 | 2/2007 | Ariel et al. |
| 2007/0233875 | A1 | 10/2007 | Raghav et al. |
| 2007/0239869 | A1 | 10/2007 | Raghav et al. |
| 2007/0276909 | A1 | 11/2007 | Chavda et al. |
| 2007/0276937 | A1 | 11/2007 | Chavda et al. |

OTHER PUBLICATIONS

"FaceTime Announces Instant Messaging for Oracle® Application Server Portal," FaceTime Press release, Sep. 8, 2003, http://www.facetime.net/pr/pr030908.aspx, [last accessed Dec. 29, 2005].

Reitter, David et al., "UI on the Fly: Generating a Multimodal User Interface," 2004, In proceedings of HLT-NAACL-2004, Boston, Massachusetts.

"Sun Java System Instant Messaging," ©1994-2005 Sun Microsystems, Inc., http://www.sun.com/software/products/instant_messaging/ds_im.xml, [last accessed Dec. 29, 2005].

Banks, Dave et al., "The ePerson Snippet Manager: a Semantic Web Application," Nov. 27, 2002, Digital Media Systems Laboratory, HP Laboratories Bristol, HPL-2002-328, © Copyright Hewlett-Packard Company 2002 [84 pages].

"Presence-Aware Communications, Overview, Benefits, Business Impact and Deployment Considerations," A Siemens White Paper, © 2004 Siemens Information and Communication Networks, Inc. [6 pages].

PCT International Search Report, International Application No. PCT/US2007/002393, Applicant: Microsoft Corporation, mailing date Jul. 19, 2007, 3 pages.

Schulzrinne, Henning, et al., "Programmable Conference Server," Technical Report, Department of Computer Science, Columbia University, Oct. 2004 [10 pages].

Basu, P. et al., "Server-Based Service Aggregation Schemes for Interactive Video-on-Demand," MCL Technical Report No. 09-01-2002, Department of Electrical and Computer Engineering, Boston University, http://hulk.bu.edu/pubs/papers/2004/TR-09-01-2002.pdf [51 pages].

Vogiazou, Yanna, "Wireless Presence and Instant Messaging," Knowledge Media Institute, The Open University, United Kingdom, Nov. 2002 [21 pages].

"Session Initiation Protocol (SIP) Extension for Event State Publication," Network Working Group, RFC 3903, Standards Track, A. Niemi, Ed., Nokia, Oct. 2004, [30 Pages].

Banerjee, Nilanjan et al., "Peer to Peer Instant Messaging and Presence Services over Wireless Ad Hoc Networks," IBM Research Report, RC 23289 (WO 408-027) Computer Science, Aug. 6, 2004 [8 pages].

Peddemors, A.J.H. et al., "Presence, location and instant messaging in a context-aware application framework," M. M. Lankhost Proceedings of the 4th International Conference on Mobile Data Management, pp. 325-330, 2003.

Fogarty, James et al., "Presence versus Availability: The Design and Evaluation of a Context-Aware Communication Client," International Journal of Human-Computer Studies (IJHCS), vol. 61, No. 3, Sep. 2004, pp. 299-317.

* cited by examiner

AGGREGATING USER PRESENCE ACROSS MULTIPLE ENDPOINTS

CROSS-REFERENCE TO RELATED APPLICATIONS

The present application is a Continuation Application of U.S. patent application Ser. No. 11/392,472, filed Mar. 28, 2006, and entitled "AGGREGATING USER PRESENCE ACROSS MULTIPLE ENDPOINTS," which application is related to U.S. patent application Ser. No. 11/392,991, entitled "User Interface For User Presence Aggregated Across Multiple Endpoints," which was filed on Mar. 28, 2006, both of which are incorporated by reference herein in their entirety.

BACKGROUND

Users of computing devices (e.g., laptops, cellular phones, and personal digital assistants) often need to communicate in real time. A common form of real-time communications is provided by instant messaging services. An instant messaging service allows participants at endpoints to send messages and have them received within a second or two by the other participants in a conversation. The receiving participants can then send responsive messages to the other participants in a similar manner. To be effective, a real-time conversation relies on the participants' becoming aware of, reviewing, and responding to received messages very quickly. This quick response is in contrast to conventional electronic mail systems in which the recipients of electronic mail messages respond to messages at their convenience.

When an initiating participant wants to start a real-time conversation, that participant needs to know whether the intended participants are available to respond in real time to a message. If not, then communications via conventional electronic mail, voice mail, or some other mechanism may be more appropriate. For example, if the computers of the intended participants are currently powered off, then a real-time conversation may not be possible. Moreover, if their computers are currently powered on, but the intended participants are away from their computers, a real-time conversation is also not possible. The initiating participant would like to know the availability of the intended participants so that an appropriate decision on the form of communication can be made.

Presence services provide this availability information. The availability status of an entity such as a computer system or a user associated with that computer system is referred to as "presence information." Presence information identifies the current "presence state" of the user. Users make their presence information available to a presence service so that other users can decide how best to communicate with them. For example, the presence information may indicate whether a user is logged on ("online") with an instant messaging server or is logged off ("offline"). Presence information may also provide more detailed information about the availability of the user. For example, even though a user is online, that user may be away from their computer in a meeting. In such a case, the presence state may indicate "online" and "in a meeting."

In an instant messaging context, a publishing user ("publisher") may provide their presence information to a presence server that then provides the presence information to subscribing users ("subscribers"). Thus, a presence server may use a subscriber/publisher model to provide the presence information for the users of the presence service. Whenever the presence information of a user changes, the presence server is notified of the change by that user's computer system and in turn notifies the subscribing users of the change. A subscribing user can then decide whether to initiate an instant messaging conversation based on the presence information of the intended participants. For example, if the presence information indicates that a publishing user is currently in a conference telephone call, then the subscribing user may decide to send an instant message, rather than place a telephone call, to the publishing user. If the subscribing user, however, needs to call and speak with the publishing user, the subscribing user needs to monitor the presence information of the publishing user to know when the call can be placed. When the subscribing user notices that the publishing user's presence information indicates that the telephone conference has been concluded, the subscribing user can then place the telephone call. RFC 2778 is a specification relating to presence information in instant messaging systems. RFC 3856 is a specification relating to presence information using the Session Initiation Protocol ("SIP").

It is not uncommon for a user to be signed into a collaboration server using many devices at the same time, thus creating multiple endpoints. For example, a user may simultaneously be signed into an instant messaging server using a personal digital assistant, a wireless telephone, and a laptop computer. In this instance, each of these endpoints contains pieces of information regarding the user, such as whether the user is typing on a device, using the device to make a phone call, etc., and the user's availability for communication or other forms of interaction with others at any instant in time. While current presence services may be suitable for providing a user's availability to communicate at a specific user endpoint, these presence services are unable to provide an accurate depiction of a user's availability to communicate when the user is signed into multiple endpoints.

SUMMARY

A method and system for aggregating user presence across multiple endpoints is provided. A presence aggregation system provides a presence server that allows users to publish information regarding their availability with the presence server. The presence server maintains a record of each user's published information. When an endpoint publishes information regarding a user's availability at that endpoint with the presence server, the presence server provides all of the user's published information, including the information just published, to each of the user's endpoints, including the endpoint which published the information. This allows each of the user's endpoints to generate an aggregated availability of the user (i.e., the availability of the user aggregated across the user's multiple endpoints). The presence server may also provide all of the user's published information, including the information just published, to each of the subscribing users' endpoints. This allows the subscribing users to also generate a view of the user's aggregated availability.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
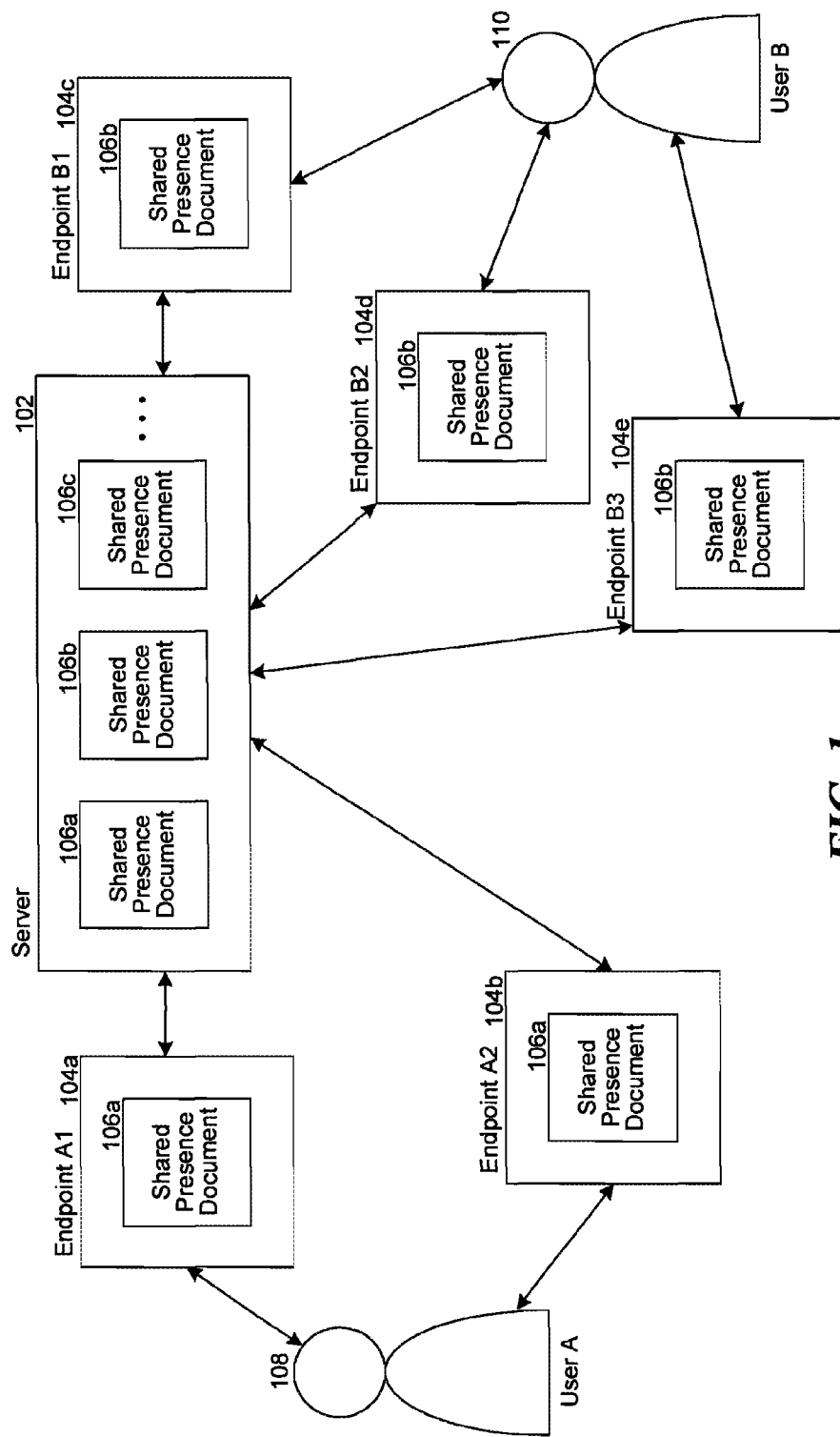
FIG. 1 is a high-level block diagram illustrating an example environment in which a presence server may operate.

A method and system for aggregating user presence across multiple endpoints is provided. In some embodiments, a presence aggregation system provides a presence server that allows users to publish information regarding their availability with the presence server. The presence server maintains a record of each user's published information. When an endpoint publishes information regarding a user's availability at that endpoint with the presence server, the presence server provides all of the user's published information, including the information just published, to each of the user's endpoints, including the endpoint which published the information. This allows each of the user's endpoints to generate an aggregated availability of the user (i.e., the availability of the user aggregated across all of the user's endpoints). The presence server may also provide all of the user's published information, including the information just published, to each of the subscribing users' endpoints. This allows the subscribing users to also generate a view of the user's aggregated availability.

In this manner, the presence aggregation system allows users to more accurately indicate their availability and willingness to communicate across all of the user's endpoints. The viewers of the published information are able to obtain a better indication of the availability and the capabilities of the user, which allows the viewers to try various modes of communication with the user. In some embodiments, the presence aggregation system may be implemented as part of a collaboration system, such as, by way of example and not limitation, MICROSOFT Office Live Communications Server and MICROSOFT Office Communicator, or as part of another collaboration system or as a separate stand-alone system.

Throughout the description, the following terms will generally have the following meanings:

The term "activity" refers to a type of event. For example, a calendaring application can produce events of a type "in-a-meeting."

The term "aggregated availability" refers to the availability associated with the user across all of the user's endpoints.

The term "aggregated presence" refers to a combined presence of a user across all of the user's endpoints.

The term "availability" refers to a user's willingness and ability to communicate. As such, a person's availability is a representation of how "available" the person is and/or whether the person can be interrupted. Availability is designated by a numerical value. The higher the number, the less reachable/available the person.

The term "callee" or "publisher" refers to the owner of the shared presence document. The callee or publisher is the user that is the target of the presence-based communication (e.g., real-time communication).

The term "caller" or "subscriber" refers to the user that is viewing a published shared presence document. The caller or subscriber is the user that initiates the presence-based communication to the publisher or callee of the published shared presence document.

The term "endpoint" refers to a single logon session of the user.

The term "event" refers to an activity that is temporary and which may impact a user's presence (e.g., user "hitting" or utilizing a keyboard, user utilizing a mouse or pointing device, etc.). An event is just an activity at a point in time.

The term "presence" refers to a set of states that are useful for determining a user's availability.

The term "state" refers to the activity that is being currently engaged in at the present time. The state can be thought of as the combination of the availability and the activity typically used to describe an on-going event, such as a machine being active or a phone being used.

In some embodiments, the presence server provides a single shared presence document for each user. In general terms, the function of a shared presence document is to convey the aggregated availability of the user to which the shared presence document belongs. Each shared presence document contains the information that was published from all of the user's endpoints and, which pertains to, and which may impact the associated user's presence. In a typical example scenario, when a user first creates an endpoint—e.g., uses a computing device (interchangeably referred to herein as a "machine") to log onto the collaboration server to which the presence server is a part—the presence server provides the user's endpoint the user's shared presence document. The endpoint then processes the information contained in the shared presence document to determine the user's aggregated availability. When the user creates another endpoint—e.g., again logs onto the collaboration server using the same machine or another machine—the presence server also provides this endpoint the user's shared presence document, and this endpoint also processes the information contained in the shared presence document to determine the user's aggregated availability. Because the same aggregation logic executes to process the shared presence document at both endpoints, both endpoints will arrive at the same aggregated availability for the user. Subsequently, when either one of these endpoints detects a need to update the contents of the user's shared presence document, for example, to publish an event, the endpoint updates the user's shared presence document that is maintained on the presence server. For example, the endpoint accesses and updates the copy of the user's shared presence document that is being stored on the presence server, thus creating a new shared presence document for the user. Once the endpoint completes updating the user's shared presence document on the presence server, the presence server provides each of the user's endpoints the user's new shared presence document. Each user endpoint then processes the information contained in the new shared presence document to determine a new (i.e., updated) aggregated availability for the user.

In some embodiments, the presence server may also provide the user's shared presence document to the endpoints of subscribing users. For example, the presence server may maintain an access control list (ACL) that contains the identities, and other information, of the subscribing users who are authorized to receive the user's shared presence document. Each endpoint of each authorized subscribing user can then process the contents of the user's shared presence document to determine an aggregated availability for the user. Because the same aggregation logic executes to process the shared presence document at the endpoints of the subscribing user, all of these endpoints will arrive at the same aggregated availability for the user, which is also the aggregated availability that was determined at each of the user's endpoints.

In some embodiments, events are published into a user's shared presence document as one of either a "user state," a "device state," or a "generic state." A user state is manually provided or set by the user and, as such, provides an indication of the user's intent. For example, the client application executing on the user's machine may provide a user interface through which the user can access a list of user states, such as "online," "busy," "do-not-disturb," "be-right-back," "away," and "appear offline." The user can then manually specify a user state by selecting one of the user states from the displayed list. When the user selects one of the user states provided in the displayed list, the client application publishes the specified user state by determining an availability value that corresponds to the specified user state, and writes the availability value into the user's shared presence document stored on the presence server. When updating the shared presence document, the client application overwrites any prior user state availability value and, thus, the shared presence document can contain at most one user state availability value. The user interface may also provide a text entry box to allow the user to provide a user note. For example, the user may use the text entry box to provide further information regarding the user's availability. The client application publishes the user notes provided by the user into the user's shared presence document stored on the presence server.

Device states provide an indication of the activeness of the machine on which the endpoint resides and, as such, may indicate the activeness of the user, for example, on the network. For example, the client application may monitor the user's machine for events such as keyboard activity or inactivity, mouse or pointing device activity or inactivity, activation of screen saver or machine lock, and other events that provide an indication of the use of the machine. When such an event is detected, the client application publishes the device state by specifying an indication of device use into the user's shared presence document stored on the presence server. The indication of device use describes the activeness of the machine in a manner to allow an availability value to be assigned to the device state described by the indication of device use, for example, by the aggregation logic during the aggregation process. By way of example, the indication of device use may specify a time the machine was last used (e.g., "idle since"); a time the user was first away from the machine (e.g., "away since"); a time the machine became active (e.g., "active since"); a time the machine became offline (e.g., "offline since"); and a time the state of the machine became unknown (e.g., "unknown since"). Using the specified indication of device use and corresponding time, the aggregation logic can infer the activeness of the machine and determine a corresponding availability value. In other embodiments, the client application can publish the device state by determining an availability value that corresponds to the detected device state, and writing the availability value into the user's shared presence document stored on the presence server.

Generic states, such as, by way of example and not limitation, calendar states, phone states, conferencing states, etc., include the events that are not published as either a user state or a device state. For example, the client application executing on the user's machine may detect an event that is not a user state or a device state. In this instance, the client application publishes the event as a generic state. By way of example, the client application may detect that a conferencing application, such as MICROSOFT's POWERPOINT, executing on the user's machine is in "full screen" mode. From this, the client application may determine that the user is currently presenting in a conference, and determine an appropriate availability value that represents the event (e.g., the event that the user is currently presenting in a conference). The client application can then publish the availability value as a generic state (e.g., a conferencing state) by writing the availability value into the user's shared presence document stored on the presence server. The client application may also publish with the generic state an extended state string that describes or represents the event which was published as a generic state. For example, the extended state string may indicate that the user is presenting in a conference. By way of other examples of events which may be published as generic states, the client application may detect that the user is currently engaged in a voice over Internet (VoIP) call and publish this information as a phone state; that the user is currently engaged in a multiparty conversation; that the user is free; that the user is in a meeting; that the user is out of the office; etc. For example, the client application can interact with a calendaring application to determine that the user is free, in a meeting, out of the office, etc., and publish this information as a calendar state.

In some embodiments, the client application may provide an application program interface (API) which allows events detected by other applications to be published. For example, applications such as a calendaring application, a phone application (e.g., VoIP application), another conferencing application, etc., can detect events and request that the client application publish the detected events into the user's shared presence document stored on the presence server.

In some embodiments, a third-party application or device may publish events by directly accessing and updating a user's shared presence document stored on the presence server. For example, a private branch exchange (PBX) device may be knowledgeable of the presence server and may have the necessary privileges (i.e., credentials) to update the contents of the user's shared presence documents stored on the presence server. When the PBX device detects a user event, such as the user being currently engaged in a telephone call, the PBX device can publish the detected user event by determining an appropriate availability value that represents the event. The PBX device can then publish the availability value as a generic state by writing the availability value into the user's shared presence document stored on the presence server.

In some embodiments, the aggregation logic determines an aggregated availability for a user as the least available state across all of the user's endpoints. When determining a user's aggregated availability, the aggregation logic converts each specified indication of device use in the shared presence document to a corresponding availability value. Each availability value specifies a device state. The aggregation logic then identifies the most available device state from the specified device states, and only uses the most available device state to perform the aggregation. To determine the user's aggregated availability, the aggregation logic checks the user's shared presence document for the presence of a user state. In the case where a user state is present in the shared presence document, the aggregation logic extracts the publication time of the user state (i.e., determines the time the user specified the user state), and sorts the other states (the identified most available device state and/or generic states) in the shared presence document by publication time to eliminate the states that are older than the user state. From the remaining states, the aggregation logic extracts the availability value from the least available state, and assigns this availability value as the user's aggregated availability. In the case where a user state is not present in the shared presence document, the aggregation logic extracts the availability value from the least available state from amongst the most available device state and the generic states, and assigns this availability value as the user's aggregated availability.

In some embodiments, the aggregation logic generates a view of the user's aggregated availability. The view provides a visual depiction of the user's aggregated availability. For example, the view may include a graphical icon that pictorially indicates the user's aggregated availability and a text string that describes the user's current aggregated availability or activity. In some cases, the view may include an extended state string from the user's shared presence document. The extended state string may have been manually provided by the user or published by an application along with a detected event. The view may be provided in a web page or any of a variety of other well-known graphical user interfaces (GUI). The GUI containing the user view may also display a list of the user's contacts along with an icon that indicates each contact's aggregated availability. The GUI may also display for a contact a text string that describes the contact's current aggregated availability or activity. In some embodiments, the GUI may allow the user to request additional information regarding a contact or another user. In this manner, the GUI allows users to identify a contact or contacts (e.g., other users), determine the contact's willingness and availability to communicate, and possibly, a future state of the contact.

In some embodiments, the GUI may allow a user to indicate that a note, such as an out-of-office note, is to be retrieved from another application. For example, an out-of-office note may be retrieved from a calendaring application. When the user indicates that a note is to be retrieved from another application, the client application can update the user's shared presence document stored on the presence server to indicate that the specified note is to be retrieved from another application. Subsequently, when the aggregation logic generates a view of the user's aggregated availability, the aggregation logic can retrieve the note from the indicated application and include the "external" note in the user's view.

FIG. 1 is a high-level block diagram illustrating an example environment in which a presence server may operate. The environment is only one example of a suitable operating environment and is not intended to suggest any limitation as to the scope of use or functionality of the presence aggregation system. For example, the environment may comprise a different number of servers, endpoints, and users than those depicted in FIG. 1. As depicted, the environment comprises a presence server 102 coupled to a plurality of endpoints 104*a*-*e*. The presence server stores and maintains a plurality of shared presence documents, including shared presence documents 106*a*-*c*. In general terms, the presence server functions as a data store for the stored shared presence documents. Each shared presence document is associated with a user. The endpoints communicate with the presence server to obtain the respective shared presence documents. For example, shared presence document 106*a* may be associated with a user A 108, and shared presence document 106*b* may be associated with a user B 110. As illustrated, user A may have created endpoint 104*a* ("endpoint A1") and endpoint 104*b* ("endpoint A2"), and user B may have created endpoint 104*c* ("endpoint B1"), endpoint 104*d* ("endpoint B2"), and endpoint 104*e* ("endpoint B3"). In this case, each of user A's endpoints (endpoint A1 and endpoint A2) obtains the shared presence document associated with user A (shared presence document 106*a*) from the presence server. Similarly, each of user B's endpoints (endpoint B1, endpoint B2, and endpoint B3) obtains the shared presence document associated with user B (shared presence document 106*b*) from the presence server.

One skilled in the art will appreciate that user A may create endpoint A1 and endpoint A2 on the same or different machines. Similarly, user B may create one or more of endpoint B1, endpoint B2, and endpoint B3 on the same or different machines. One skilled in the art will also appreciate that the shared presence document associated with user A and the shared presence document associated with user B may be stored and maintained on different presence aggregations servers.

The endpoints may communicate with the presence server over a network, which is typically a communications link that facilitates the transfer of electronic content between the attached devices. In some embodiments, the network includes the Internet. It will be appreciated that the network may be comprised of one or more other types of networks, such as a local area network, a wide area network, a point-to-point dial-up connection, a wireless network, and the like.

Figure 2:
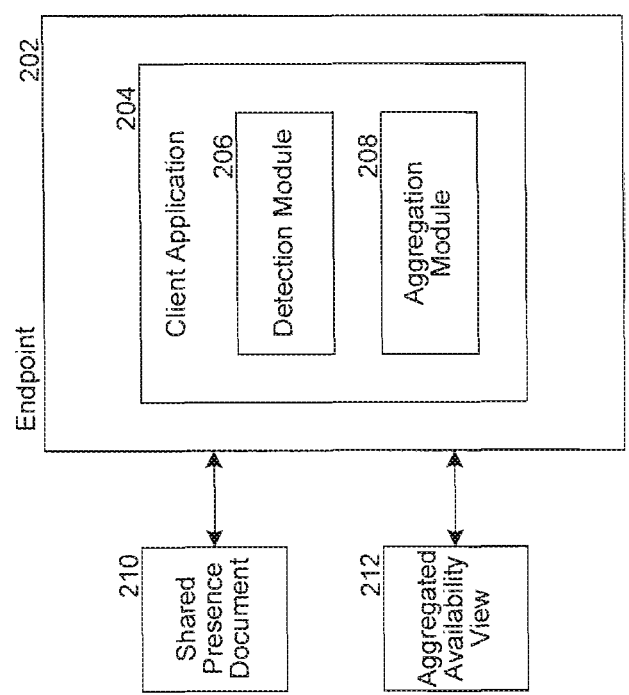
FIG. 2 is a block diagram that illustrates selected components of an endpoint, according to some embodiments.

FIG. 2 is a block diagram that illustrates selected components of an endpoint, according to some embodiments. An endpoint 202 is an instance of a client application 204 running on a machine and signed into by a user, for example, in order to access the services provided by a collaboration server that incorporates the presence aggregation system. As depicted, the client application comprises a detection module 206 and an aggregation module 208. The detection module may monitor the machine on which the endpoint is created for events, and publish the detected events in the user's shared presence document that is stored and maintained on the presence server. When the endpoint receives from the presence server the user's shared presence document, the aggregation module processes the contents of the shared presence document to determine an aggregated availability of the user. The endpoint may receive the user's shared presence document when the endpoint is first created or subsequent to one of the user's endpoints updating the shared presence document on the presence server, for example, to publish an event. In some embodiments, the client application may also provide an API (not shown) that allows other applications to publish events. For example, a third-party application may detect an event, and pass information regarding the detected event to the detection module along with a request to publish the event in the user's shared presence document on the presence server.

The endpoint is associated with a shared presence document 210 and an aggregated availability view 212. The shared presence document is provided by a presence server, and contains information that pertains to the presence of its associated user. In some embodiments, the shared presence document contains the information that pertains to the user and which was gathered and published by the user's various endpoints, as well as devices (e.g., PBX device, etc.) and resources (e.g., third-party applications, etc.).

The aggregated availability view provides a visual depiction of the user's aggregated availability. For example, the aggregated availability view may include a graphical icon that pictorially indicates the user's aggregated availability and a text string that describes the type of state the user is engaged in. In some cases, the aggregated availability view may include an extended text string from the user's shared presence document. The extended text string may have been manually provided by the user or published by an application along with a detected event. The aggregated availability view may also include information provided by or extracted from applications running on the user's machine. For example, the client application may periodically check a calendaring application and extract information regarding the user's schedule and include the extracted information as part of the user's view.

The computing device on which the presence aggregation system is implemented, including the presence server and the endpoints, may include a central processing unit, memory, input devices (e.g., keyboard and pointing devices), output devices (e.g., display devices), and storage devices (e.g., disk drives). The memory and storage devices are computer-readable media that may contain instructions that implement the presence aggregation system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the presence aggregation system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The presence aggregation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
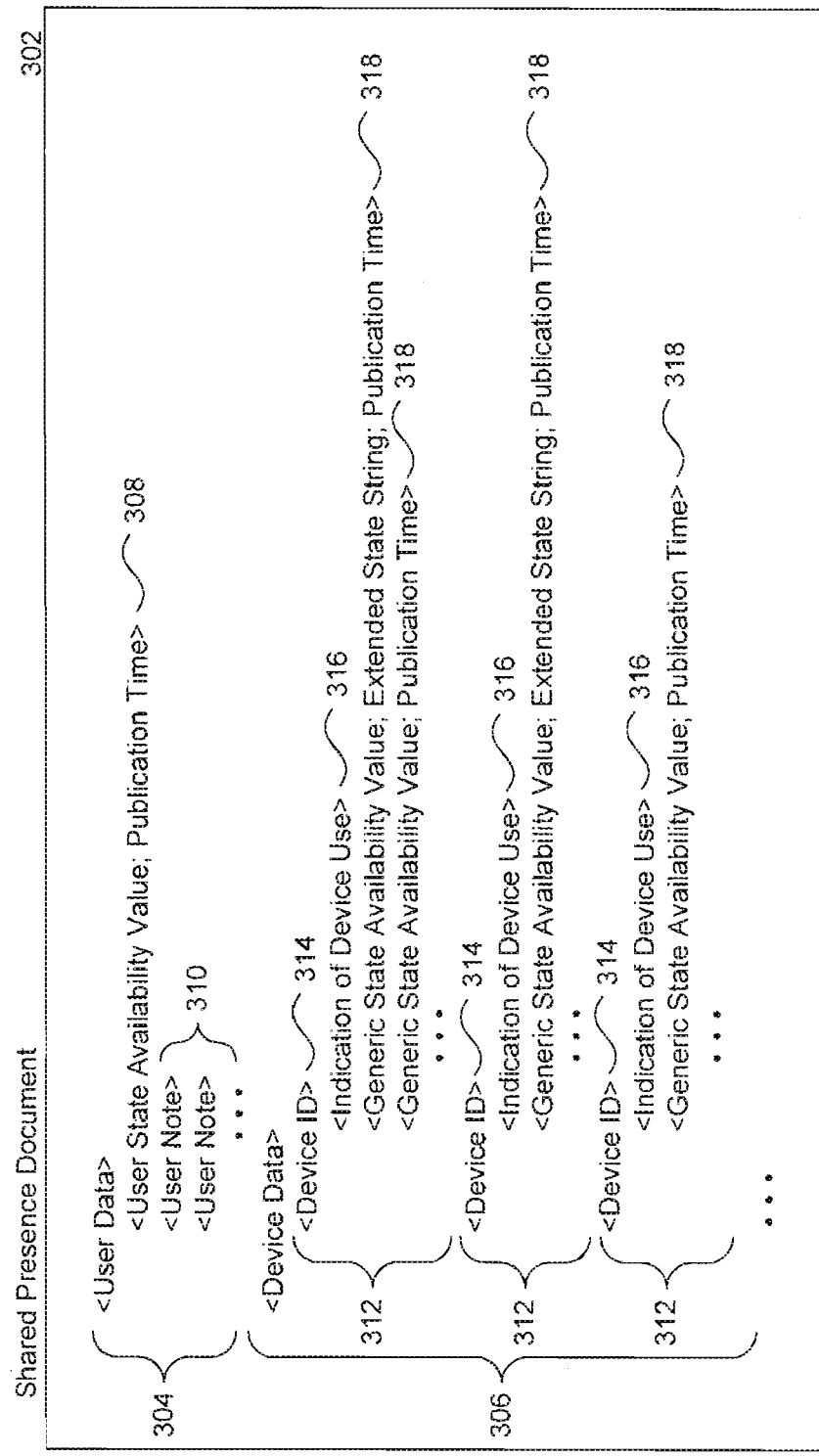
FIG. 3 is a diagram illustrating selected contents of an example shared presence document, according to some embodiments.

FIG. 3 is a diagram illustrating selected contents of an example shared presence document, according to some embodiments. The presence aggregation system creates a shared presence document for each user, and each user's shared presence document contains the collection of information gathered from a user's various endpoints, resources and devices that would impact the user's presence. As depicted, a shared presence document 302 comprises a user data section 304 and a device data section 306.

The user data section contains the events which were published into the shared presence document as a user state. As displayed, the user data section contains a user state element 308 and a plurality of user note elements 310. The user state element, when present, represents a manually specified user state and contains a user state availability value and a publication time. The user state availability value is a number that represents the user state that was specified by the user, and the publication time indicates the time the user state was published. Table 1 contains a list of example user states, corresponding user state availability values, and short descriptions.

TABLE 1

| User State | Availability Value | Description |
| --- | --- | --- |
| Online | 3500 | User is reachable |
| Busy | 6500 | User is busy |
| Do Not Disturb | 9500 | User should not be interrupted |
| Be Right Back | 12500 | User is not currently reachable |
| Away | 15500 | User is not at their desk |
| Appear Offline | 18500 | User wants to be offline |

The user states listed in Table 1 are ranked according to their indication of availability from more available to less available, where the larger availability value corresponds to the less available state. For example, from amongst the six user states listed in Table 1, "Online" is the most available user state and "Appear Offline" is the least available user state. Using the availability values from Table 1, when a user manually specifies a user state of "Online," this user state will be published into the user's shared presence document as a user state availability value of 3500, along with an indication of the time of publication.

The user note element, when present, is a free-form, text string that is manually specified by the user. A user note may be useful to provide further information regarding a manually specified user state. The user note elements appearing in the user data section are not considered in generating the user's aggregated availability. The user state and user notes are optional in that a user is not required to, and may not have specified a user state and/or a user note. If a user does not specify a user state or a user note, the user data section of the user's shared presence document is empty. In some embodiments, a note may also impact aggregation. For example, when the availability value is equal to or greater than the availability value for "Away," a calendar out-of-office note may be used to set the extended state string to "Out of Office," and the note may be displayed as part of the view.

The device data section contains the events which were automatically published into the shared presence document as a device state or a generic state. The device data section contains a device section 312 for each user endpoint that published an event or events into the shared presence document. For example, the user may have created an endpoint on each of a smart phone, a laptop computer, and a desktop computer, and the endpoints on each of these devices may have published one or more events into the user's shared presence document. In this case, the user's shared presence document contains a respective device section for each of the user's three endpoints. Moreover, the events published by the endpoints are written into their corresponding device section. For example, the events published by the endpoint on the user's smart phone will be written into the device section for that endpoint. Similarly, the events published by the endpoint on the user's laptop computer will be written into the device section for that endpoint, and the events published by the endpoint on the user's desktop computer will be written into the device section for that endpoint.

As shown, the device data section contains three device sections, each delimited by a device ID element 314. The device ID element is a unique string that identifies an endpoint. The endpoint may choose its unique string when the endpoint is created. As displayed, each device section contains an indication of device use 316 and zero, one, or more generic state elements 318. The indication of device use, when present, is the information that was published, and which describes a device state. The aggregation module can determine a device state that represents the indication of device use, and use the device state to determine a corresponding availability value. Table 2 contains a list of example device states, corresponding availability values, and short descriptions.

TABLE 2

| Device State | Availability Value | Description |
| --- | --- | --- |
| Active | 3500 | User is actively using the device and is reachable |
| Inactive | 3750 | User has not used the device but is still likely to be reachable |
| Unknown | 3750 | The device cannot determine if the user is reachable |
| Away | 15500 | User is probably not at the device and is not reachable |
| Offline | 18500 | User is not logged on and definitely not reachable |

Similar to the user states listed in Table 1, the device states listed in Table 2 are ranked according to their indication of availability from more available to less available, where the larger availability value corresponds to the less available state. Moreover, from Tables 1 and 2, it can be seen that the device state of "Away" indicates a less available state that a user state of "Do Not Disturb." For example, the aggregation module may determine that a specified indication of device use indicates that the device state is "Active" and assign an availability value of 3500 to the device state.

The generic state element, when present, represents a published generic state and contains a generic state availability value, a publication time, and an optional extended state string. The generic state may be a phone state, a calendar state, a conferencing state, or any other non-user and non-device state which may indicate an activity that a user is currently engaged in. The generic state availability value is a number that represents the generic state that was published by, for example, the endpoint, and the publication time indicates the time the generic state was published. The extended state string, when present, is a text string that is provided by the publisher (e.g., the application that detected the event that is being published as a generic state), and which further describes the event that is being published as a generic state. Table 3 contains a list of example generic states, corresponding generic state availability values, and short descriptions.

TABLE 3

| Generic State | Availability Value | Description |
| --- | --- | --- |
| In a 1-on-1 conversation | 6500 | User is speaking with one person |
| In a multiparty conversation | 6750 | User is speaking with more than one person |
| Free | 3500 | User has no meeting |

TABLE 3-continued

| Generic State | Availability Value | Description |
| --- | --- | --- |
| Tentative | 3500 | User has a meeting they have not accepted |
| In a meeting | 6500 | User has accepted a meeting |
| Out of Office | 3500 | User is not in the office |
| Presenting | 9500 | User in full screen mode |
| In a multiparty conversation | 6750 | User is speaking with more than one person in the same conversation in a mode other than instant messaging (IM) |

Similar to the user states listed in Table 1 and the device states listed in Table 2, the generic states listed in Table 3 are ranked according to their indication of availability from more available to less available, where the larger availability value corresponds to the less available state. The first two generic states ("In a 1-on-1 conversation" and "In a multiparty conversation") are generic states that are likely to have resulted from events detected by or from a phone application. The next four generic states ("Free," "Tentative," "In a meeting," and "Out of Office") are generic states that are likely to have resulted from events detected by or from a calendaring application. The last three generic states ("Presenting," "Urgent interruptions only," and "In a multiparty conversation") are generic states that are likely to have resulted from events detected by or from a conferencing application. Using the availability values from Table 3, the generic state "Free" will be published into the user's shared presence document as a generic state availability value of 3500, along with an indication of the time of publication.

A user's aggregated availability is determined from the availability values, such as the availability values listed above in Tables 1, 2, and 3, which are published in the user's shared presence document. Table 4 contains a mapping of availability values to corresponding aggregated availabilities, icons, and descriptions

TABLE 4

| Aggregated Availability | Availability Value Range | Description |
| --- | --- | --- |
| Online | 3000-3999 | User is reachable |
| Busy | 6000-6999 | User is reachable but is engaged in another task |
| Do Not Disturb | 9000-9999 | User is reachable but does not want to be interrupted |
| Temporarily Away | 12000-12999 | User is temporarily probably not reachable |
| Away | 15000-15999 | User is probably not reachable |
| Offline | 18000-18999 | User is not reachable |

As shown in Table 4, a range of availability values maps to each aggregated availability. For example, the availability values in the range 3000-3999 map to the aggregated availability "Online." Mapping a range of availability values to a single aggregated availability allows for a ranking of availability values within a class of availabilities. For example, the generic states "In a multiparty conversation" and "In a meeting" above in Table 3 will both map to the same aggregated availability "Busy." Even though both of these states result in the same aggregated availability, the generic state "In a multiparty conversation" is ranked lower (i.e., less available) than the generic state "In a meeting" because of its larger availability number (6750>6500). As such, if the user's aggregated availability is to be chosen from these two generic states, the generic state "In a multiparty conversation" will be selected as the user's aggregated availability. As a result, assuming that an extended state string was published with both of the generic states, the extended state string that is published with the generic state "In a multiparty conversation" will be displayed as part of the user's view if this extended state string is understood by the aggregation module.

Figure 4:
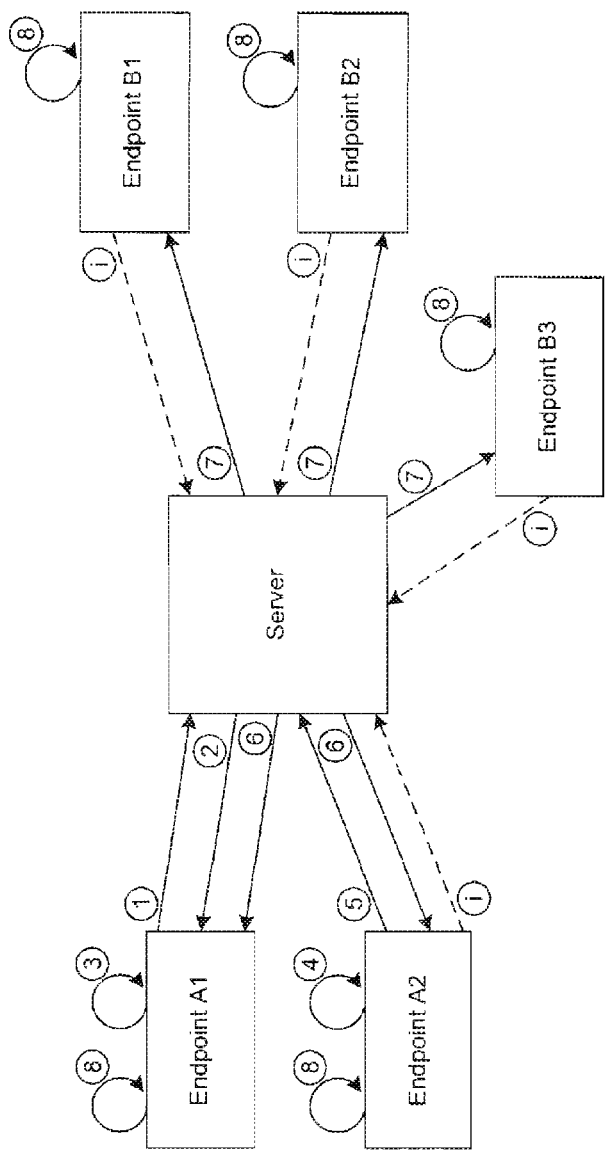
FIG. 4 is a diagram illustrating a flow of information between multiple endpoints and the presence server in publishing user events, according to some embodiments.

FIG. 4 is a diagram illustrating a flow of information between multiple endpoints and the presence server in publishing user events, according to some embodiments. By way of example, a user A may have created an endpoint A2 with the presence server (or a collaboration system that provides the presence server), and a user B may have created endpoints B1, B2, and B3 with the presence server (stage i). As a result, the presence server may have provided endpoint A2 user A's shared presence document, and the presence server may have provided each of endpoints B1, B2, and B3 user B's shared presence document. Subsequently, user A also creates an endpoint A1 with the presence server (stage 1). In response, endpoint A1 receives from the presence server user A's current shared presence document (stage 2). Subsequent to receiving user A's shared presence document, endpoint A2 determines user A's aggregated availability from the contents of user A's shared presence document, and generates a view of user A's aggregated availability (stage 3). Subsequently, endpoint A2 detects an event (stage 4). In response, endpoint A2 publishes the event in user A's shared presence document on the presence server, thus creating a new shared presence document for user A on the presence server (stage 5). In response, the presence server provides user A's new shared presence document to both of user A's endpoints A1 and A2 (stage 6). The presence server also provides user A's new shared presence document to the endpoints of the subscribing users who have requested and who are authorized to receive user A's shared presence document. For example, user B may have subscribed with the presence server to receive user A's shared presence document, and user A may have provided authorization for user B to receive user A's shared presence document. In this instance, the presence server provides user A's new shared presence document to each of user B's endpoints B1, B2, and B3 (stage 7). Subsequent to receiving user A's new shared presence document, endpoints A1, A2, B1, B2, and B3 each determine user A's aggregated availability from the contents of user A's new shared presence document, and generate a view of user A's aggregated availability (stage 8).

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps without detracting from the essence of the invention.

Figure 5:
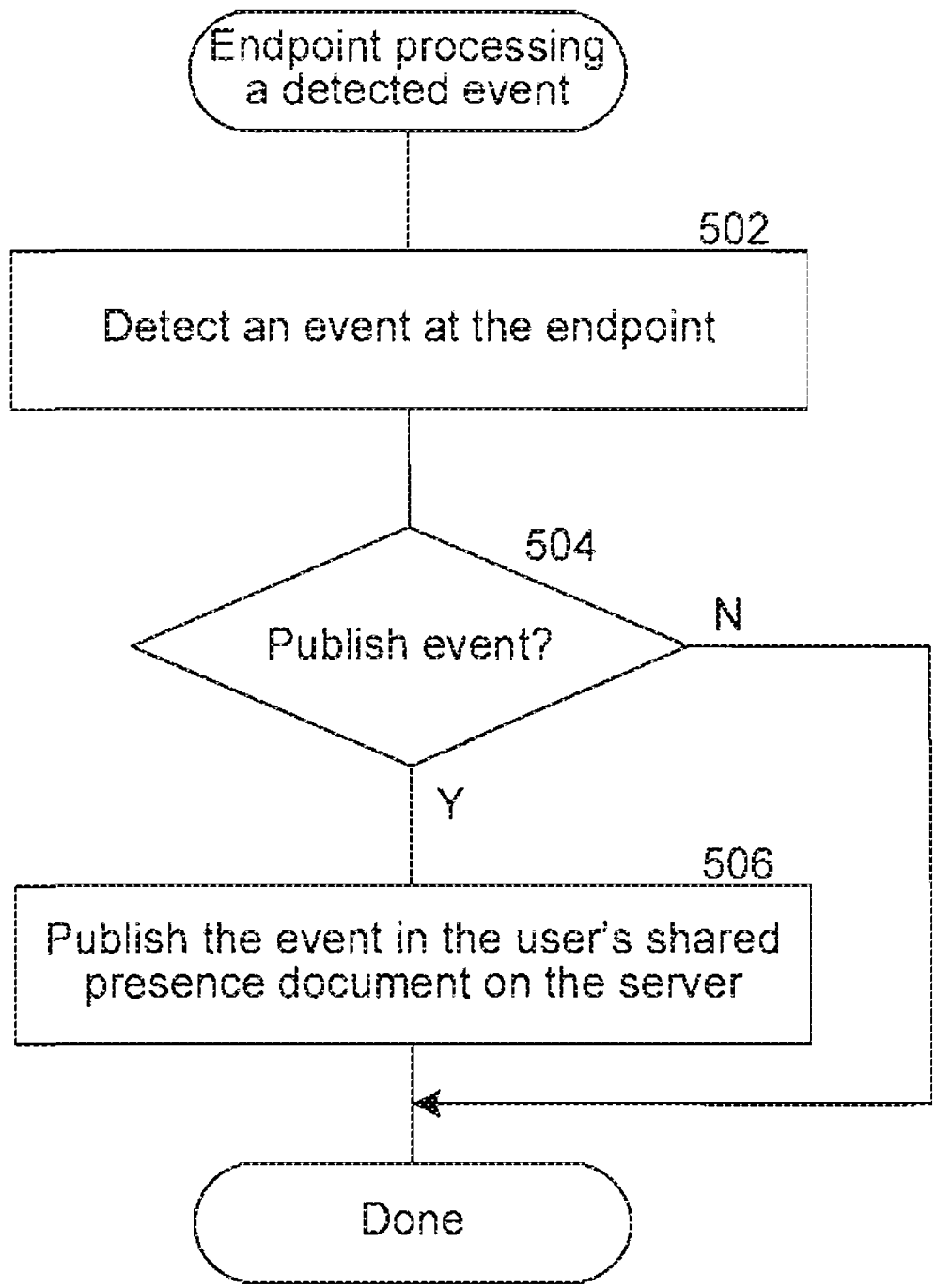
FIG. 5 is a flow diagram that illustrates an endpoint publishing an event, according to some embodiments.

FIG. 5 is a flow diagram that illustrates an endpoint publishing an event, according to some embodiments. By way of example, a user "Joe" may have used his laptop computer and created an endpoint with the presence server. In block 502, an event is detected at the endpoint. For example, the endpoint may have detected the event by monitoring the laptop computer and/or the application processes which are executing on the laptop computer. Alternatively, an application that is executing on the laptop computer may have detected the event, and is requesting the endpoint (e.g., the client application that Joe used to create the endpoint) to publish the detected event. In block 504, the endpoint checks to determine whether or not to publish the detected event. For example, the endpoint does not publish the event (i.e., presence) every time the endpoint detects keyboard activity. In some embodiments, the endpoint publishes a detected event if the detected event changes the value of the state (e.g., device state, generic state, etc.). If the endpoint determines that the detected event should be published, then, in block 506, the endpoint publishes the event in the user's shared presence document on the presence server. Continuing the above example, the endpoint updates Joe's shared presence document on the presence server to include an availability value that represents the detected event.

Figure 6:
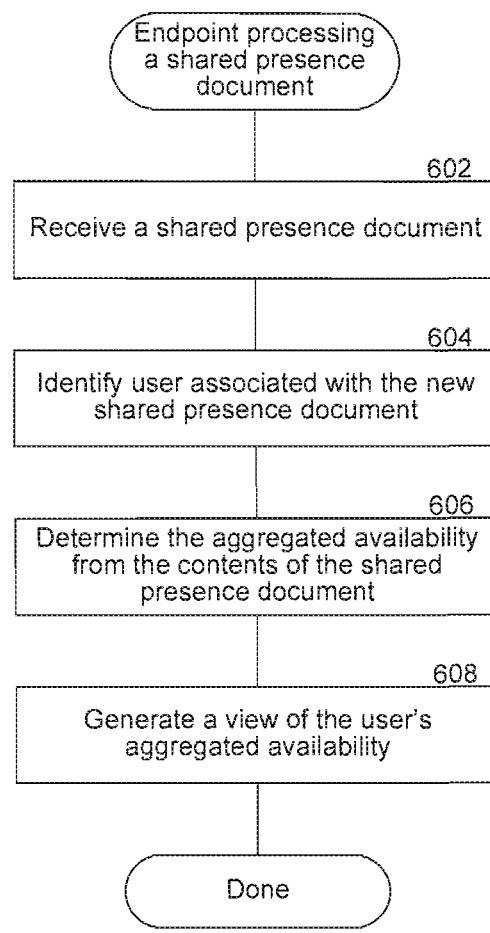
FIG. 6 is a flow diagram that illustrates an endpoint processing a new shared presence document, according to some embodiments.

FIG. 6 is a flow diagram that illustrates an endpoint processing a new shared presence document, according to some embodiments. In block 602, the endpoint receives from the presence server a shared presence document. In block 604, the endpoint identifies the user that is associated with the shared presence document. Continuing the above example, Joe's endpoint, which was created on his laptop computer, may receive from the presence server Joe's new (i.e., updated) shared presence document. In block 606, the endpoint determines an aggregated availability of the user by processing the contents of the shared presence document. In block 608, the endpoint generates a view of the user's aggregated availability. Continuing the above example, Joe's endpoint on his laptop computer determines Joe's aggregated availability from the contents of Joe's new shared presence document and generates a view of Joe's aggregated availability.

Figure 7:
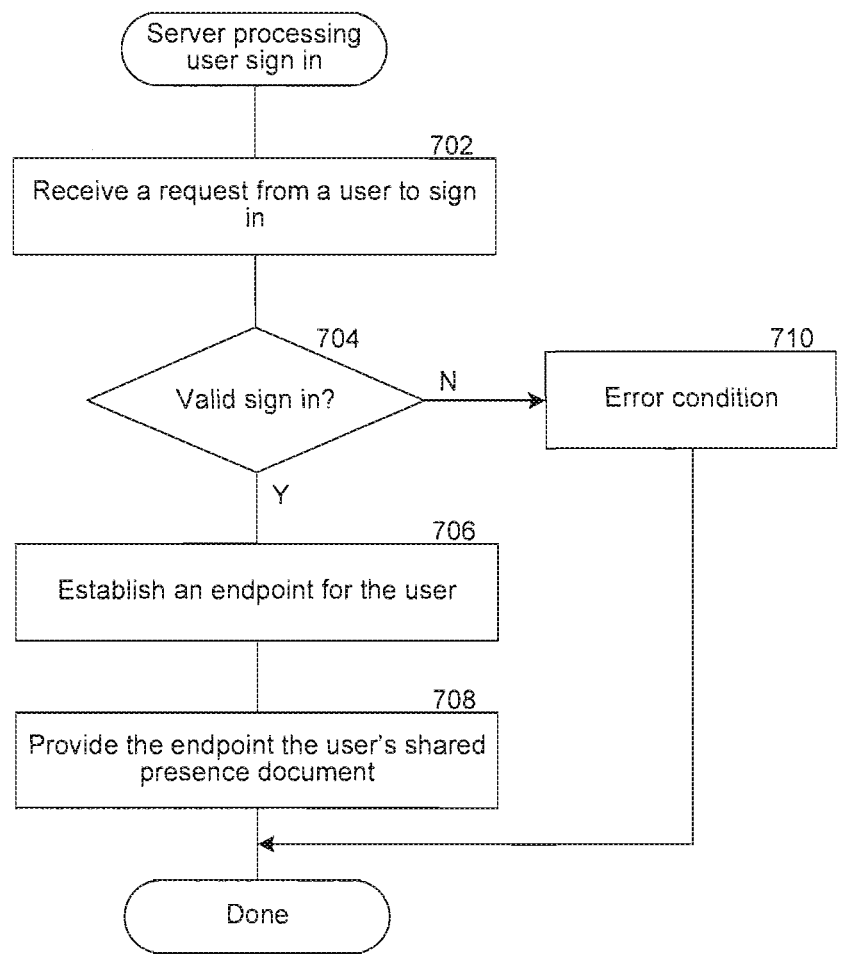
FIG. 7 is a flow diagram that illustrates a collaboration server processing a request to sign in, according to some embodiments.

FIG. 7 is a flow diagram that illustrates a collaboration server processing a request to sign in, according to some embodiments. By way of example, the collaboration server may provide the collaboration functionality, including the presence server. In block 702, the collaboration server receives a request from a user to sign into the collaboration server. In block 704, the collaboration server checks to determine if the sign in request is valid (e.g., is the user authorized to sign onto the collaboration server). If the sign in request is valid, then, in block 706, the collaboration server establishes an endpoint for the user. In block 708, the collaboration server provides the endpoint a current copy of the user's shared presence document. The collaboration server can request the presence server to provide the endpoint the current copy of the user's shared presence document. If a shared presence document for the user does not presently exist on the presence server, the presence server can create a shared presence document for the user, and provide the endpoint the created shared presence document. For example, a shared presence document may not presently exist on the presence server if this is the first time the user is signing in. If, in block 704, the sign in request is invalid, then, in block 710, the collaboration server generates an error condition. For example, the collaboration server may log the failed sign in attempt in an error log. The collaboration server may allow the user to re-enter authentication information upon a failed attempt to sign in.

Figure 8:
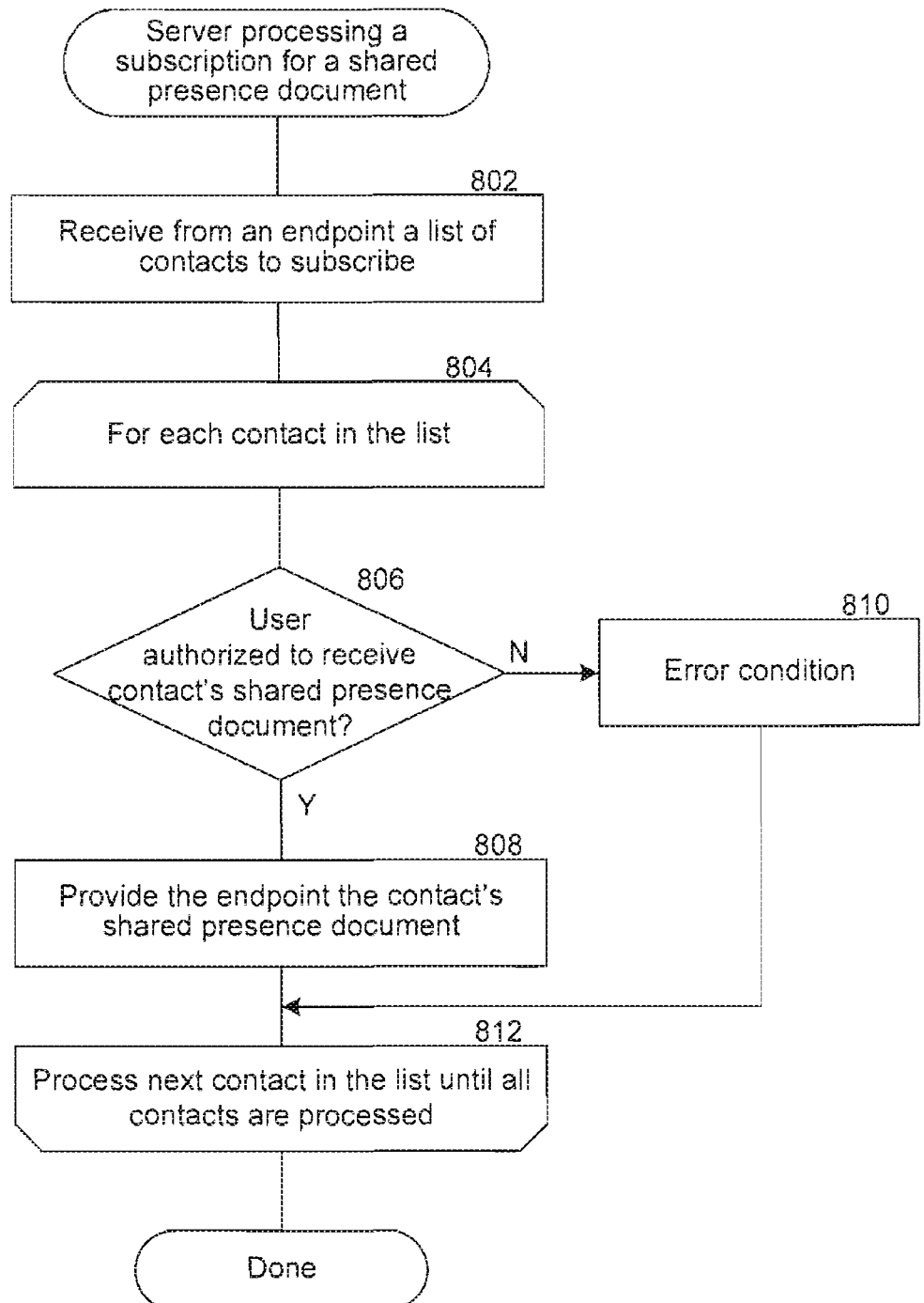
FIG. 8 is a flow diagram that illustrates a presence server processing a subscription for a shared presence document, according to some embodiments.

FIG. 8 is a flow diagram that illustrates a presence server processing a subscription for a shared presence document, according to some embodiments. By way of example, a user at an endpoint may subscribe with the presence server to receive the shared presence documents of the specified contacts each time there is a change to specified contacts' shared presence documents. In block 802, the presence server receives from the endpoint a list of contacts to subscribe. Then, for each contact specified in the list (block 804), the presence server performs blocks 806 to 810, until all the contacts specified in the list are processed (block 812). In block 806, the presence server checks to determine whether the user is authorized to receive the contact's shared presence document. For example, the contact may have previously provided a list of users (e.g., the contact's contacts) who are authorized to receive the contact's shared presence document and, as a result, view the contact's aggregated availability. In some embodiments, the presence server may maintain this information in one or more tables or an ACL. If the presence server determines that the user is authorized to receive the contact's shared presence document, then, in block 808, the presence server provides the endpoint the contact's shared presence document. Otherwise, in block 810, the presence server generates an error condition, and continues processing the next contact identified in the contact list. For example, the presence server may send an alert or a notification to the contact informing of the attempt by the user to access the contact's shared presence document. The presence server may also log the attempt to access the contact's shared presence document in an error log. In some embodiments, the presence server may provide unauthorized users a shared presence document which indicates that the contact is "offline." This allows the contact to appear offline to users who do not have access to the contact's shared presence document.

Figure 9:
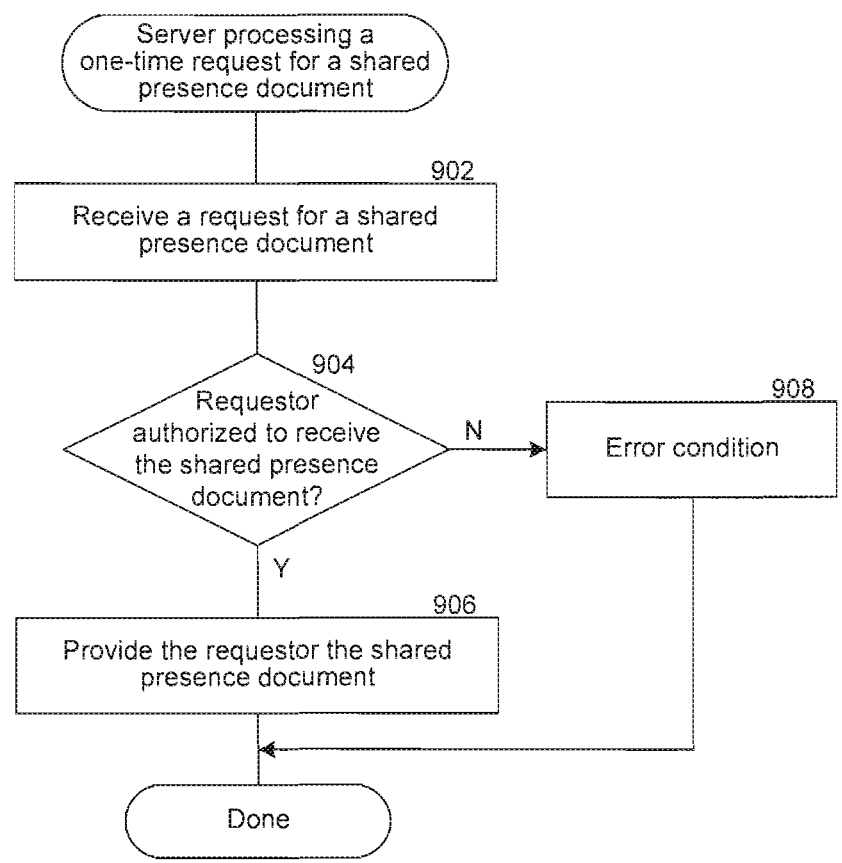
FIG. 9 is a flow diagram that illustrates the presence server processing a one-time request for a shared presence document, according to some embodiments.

FIG. 9 is a flow diagram that illustrates the presence server processing a one-time request for a shared presence document, according to some embodiments. By way of example, a user at an endpoint may use a UI to submit a one-time request for another user's shared presence document. In block 902, the presence server receives a request for a shared presence document. In block 904, the presence server checks to determine whether the requestor (e.g., the requesting user) is authorized to receive the specified shared presence document. If the presence server determines that the requestor is authorized to receive the specified shared presence document, then, in block 906, the presence server provides the requestor the specified shared presence document. Otherwise, in block 908, the presence server generates an error condition.

Figure 10:
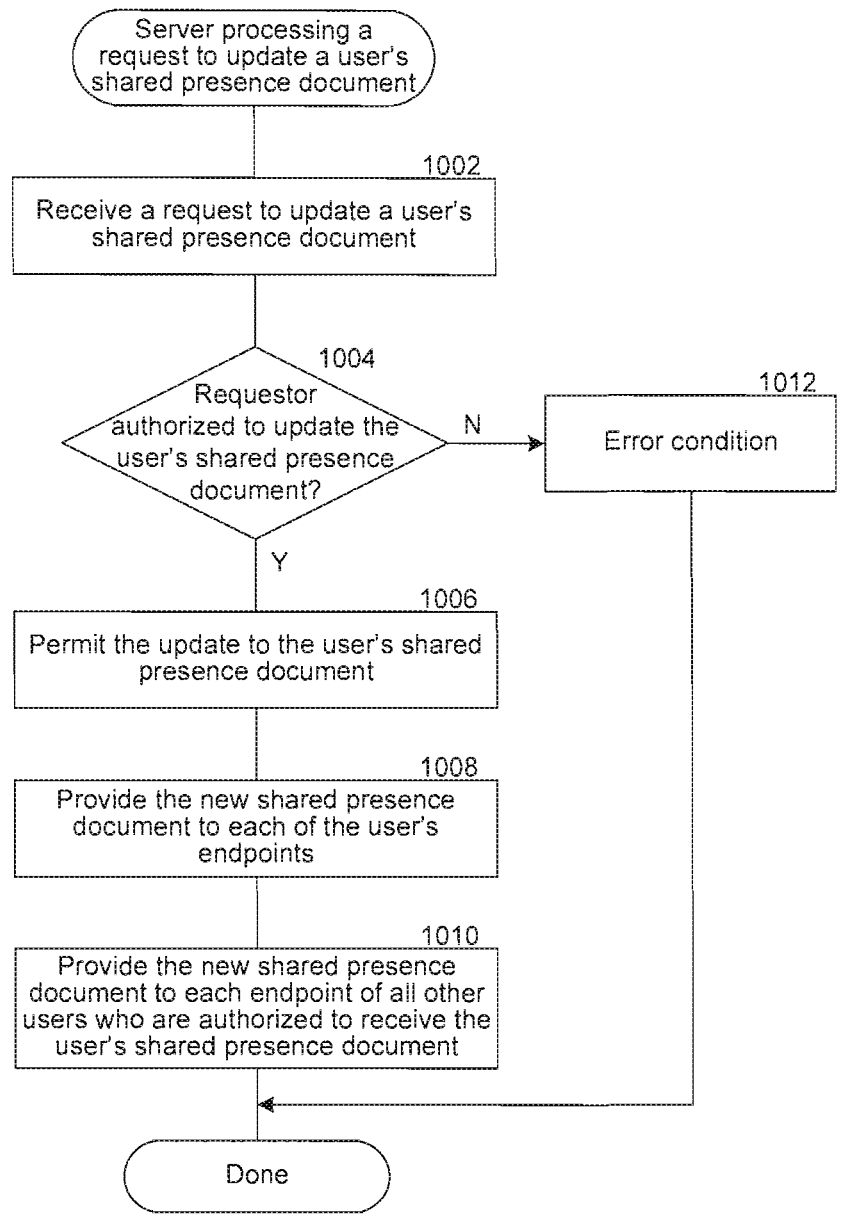
FIG. 10 is a flow diagram that illustrates the presence server processing a request to update a user's shared presence document, according to some embodiments.

FIG. 10 is a flow diagram that illustrates the presence server processing a request to update a user's shared presence document, according to some embodiments. By way of example, an endpoint may determine a need to publish a detected event. In block 1002, the presence server receives a request to update a user's shared presence document that is being maintained on the server. In block 1004, the presence server checks to determine whether the requestor is authorized to update the user's shared presence document. If the presence server determines that the requestor is authorized to update the user's shared presence document, then, in block 1006, the presence server permits the update to the user's shared presence document. For example, the requestor may update the user's shared presence document by including in the user's shared presence document an availability value that corresponds to the detected event. In block 1008, the presence server provides the user's new (i.e., updated) shared presence document to each of the user's endpoints. In block 1010, the presence server provides the user's new shared presence document to each endpoint of all the other users (e.g., the subscribing users) who are authorized to receive the user's shared presence document. If, in block 1004, the presence server determines that the requestor is not authorized to update the user's shared presence document, then, in block 1012, the presence server generates an error condition. For example, the presence server may log the attempt to update the user's shared presence document in an error log.

Figure 11:
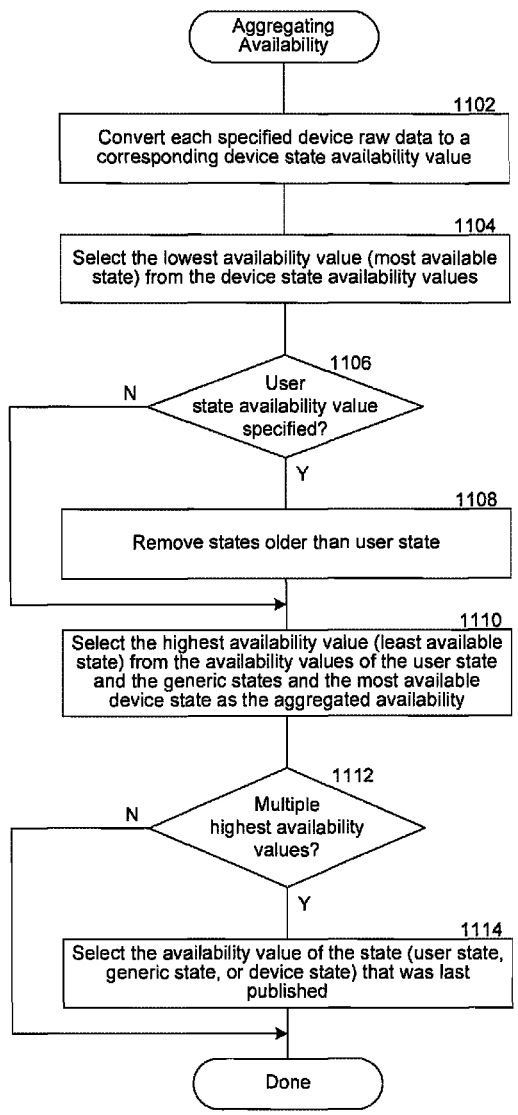
FIG. 11 is a flow diagram that illustrates an endpoint aggregating availability from contents of a shared presence document, according to some embodiments.

FIG. 11 is a flow diagram that illustrates an endpoint aggregating availability from contents of a shared presence document, according to some embodiments. By way of example, whenever a user endpoint receives a shared presence document, the aggregation module of the instance of the client application running on the user's machine may generate an aggregated availability from the contents of the shared presence document. It will be appreciated that the shared presence document may be the user's shared presence document or a contact's (e.g., another user's) shared presence document. In block 1102, the aggregation module converts each indication of device use specified in the shared presence document to a corresponding device state availability value. In block 1104, the aggregation module selects the lowest availability value (i.e., the most available device state) from amongst the device state availability values. In block 1106, the aggregation module checks the contents of the shared presence document to determine if a user state is specified. If the aggregation module determines that a user state is specified in the shared presence document, then, in block 1108, the aggregation module removes the states in the shared presence document that are older than the user state from the aggregated availability determination. For example, the aggregation module identifies from the generic states and the selected most available device state the states which have a publication time that is subsequent to the publication time of the user state. In block 1110, the aggregation module selects as the aggregated availability the highest availability value (i.e., the least available state) from the user state availability value and the respective availability values of the states identified in block 1108 (i.e., the states which where published after the user state), and proceeds to block 1114. If, in block 1106, the aggregation module determines that a user state is not specified in the shared presence document, or subsequent to removing the states that are older than the specified user state in block 1108, the aggregation module selects as the aggregated availability the highest availability value (i.e., the least available state) from the availability values of the user state (if specified) and the generic states and the selected most available device state, in block 1110. In block 1112, the aggregation module checks to determine whether there were more than one highest availability value. If there is more than one highest availability value, then, in block 1114, the aggregation module selects as the aggregated availability the highest availability value of the state that was last published.

Figure 12:
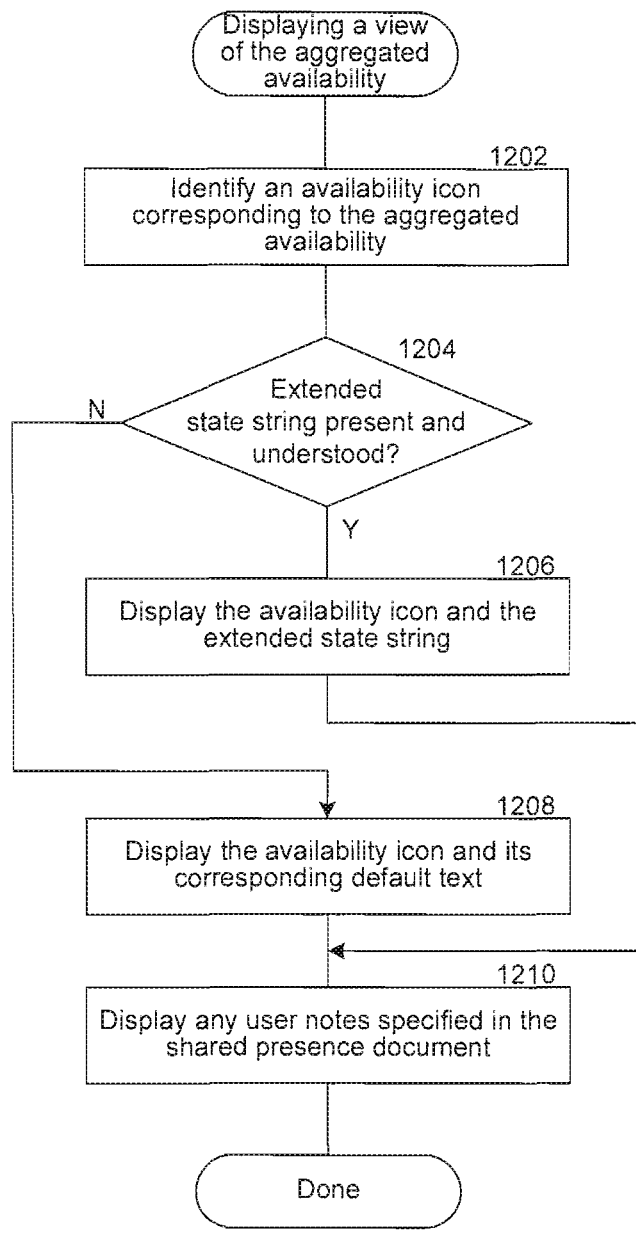
FIG. 12 is a flow diagram that illustrates an endpoint displaying a view of an aggregated availability determined from a shared presence document, according to some embodiments.

FIG. 12 is a flow diagram that illustrates a user's endpoint displaying a view of an aggregated availability determined from a shared presence document, according to some embodiments. In block 1202, the aggregation module identifies an availability icon that corresponds to the aggregated availability value determined from the contents of a shared presence document. In block 1204, the aggregation module checks to determine whether an extended state string is present in the shared presence document and, if so, whether the aggregation module understands the specified extended state string. If the aggregation module determines that an extended state string is specified and that it understands the specified extended state string, then, in block 1206, the aggregation module displays the availability icon and the extended state string as part of the view. Otherwise, if the aggregation module determines that an extended state string is not specified or it does not understand the specified extended state string (block 1204), then, in block 1208, the aggregation module displays the availability icon and its corresponding default text string as part of the view. The default text string may textually describe the availability icon. Subsequent to displaying the availability icon and either the extended state string (block 1206) or the default text string (block 1208), in block 1210, the aggregation module may display any user notes that are specified in the shared presence document as part of the view.

In some embodiments, if a user's aggregated availability is "away" or "offline," and an out-of-office note is not specified in the user's shared presence document, the aggregation module displays a default out-of-office text string (e.g., Out of the Office") with the availability icon as part of the user's view. In some instances, the aggregation module may display the default "Out of the Office" note even when the shared presence document contains an out-of-office note. For example, if the user's aggregated availability is "away" or "offline," and an out-of-office note is specified in the user's shared presence document, the aggregation module may display a default out-of-office text string (e.g., Out of the Office") with the availability icon as part of the user's view. In some embodiments, the user's shared presence document may indicate that a note or item of information is to be retrieved from a specified application. In this case, the aggregation module may attempt to retrieve the note or the item of information from the specified application and display the retrieved note or item of information as part of the user's view.

Figure 13:
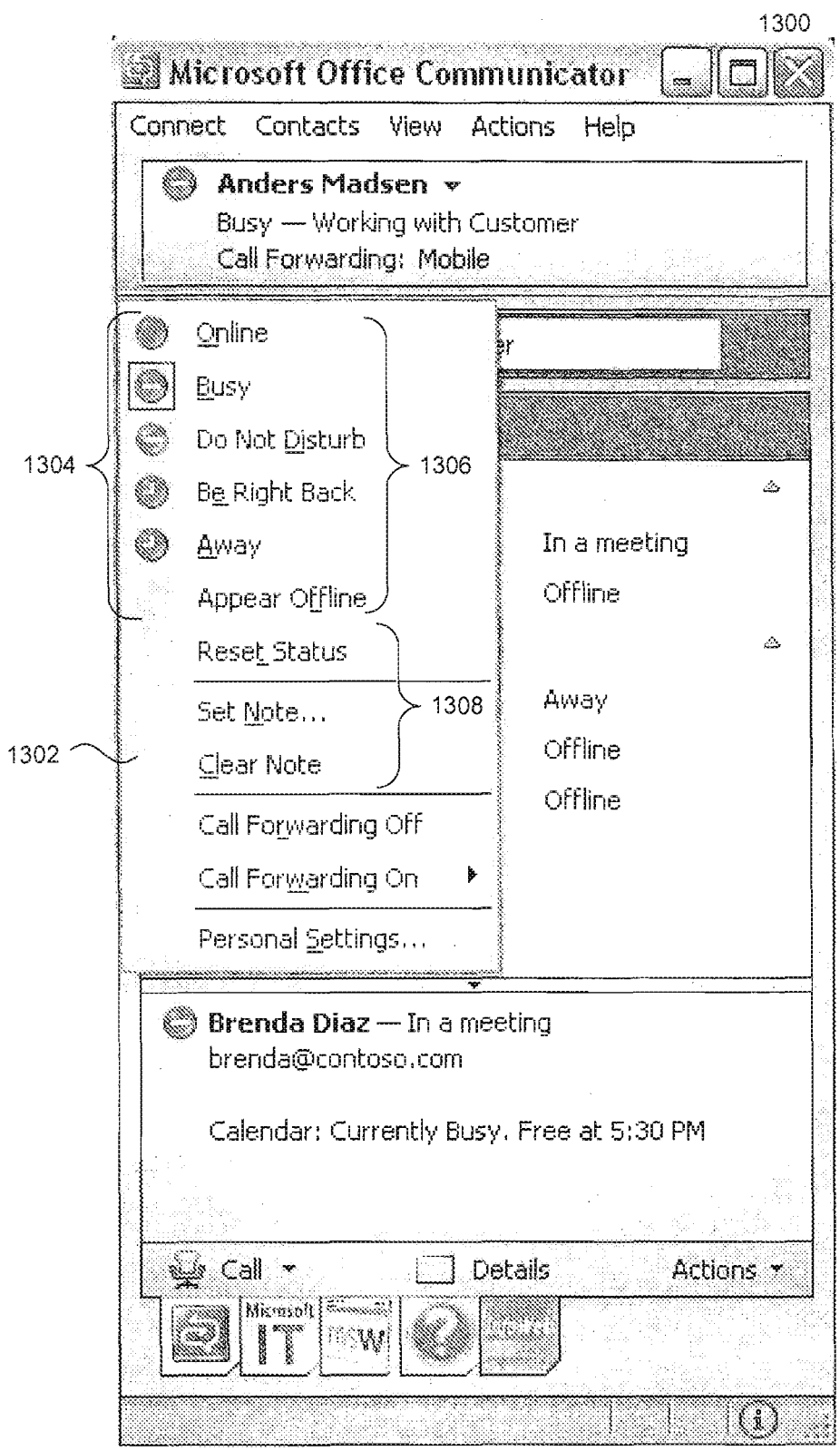
FIG. 13 is a display diagram showing a sample user interface displaying a drop-down menu containing a list of selectable user states, according to some embodiments.

FIG. 13 is a display diagram showing a sample user interface displaying a drop-down menu containing a list of selectable user states, according to some embodiments. User interface 1300 may be displayed by an instance of a client application signed into by a user to create an endpoint. The user interface allows the user to view a list of available user states from which the user can manually specify a user state. The user interface allows access to a subwindow or drop-down window 1302. Subwindow 1302 displays a list of icons 1304 and corresponding default text strings 1306. Each icon in the list represents a user state, such as, by way of example, "Online," "Busy," "Do Not Disturb," "Away," and "Offline,", and its corresponding default text string textually describes the user state that is represented by the icon. The icons for "Online," "Busy," and "Do Not Disturb" represent decreasing levels of the user's willingness to communicate, while the icons for "Away" and "Offline" represent decreasing levels of the user's availability. As illustrated in FIG. 13, the first icon in the list represents the user state "Online" as indicated by its corresponding default text string. Moreover, the icons may be of various colors and/or include different figures (e.g., line arrangements) depending on the represented user state. For example, the icon that represents the user state "Busy" may be of a blue color and include a single horizontal bar or line. In contrast, the icon that represents the user state "Do Not Disturb" may be of a red color and include a single horizontal bar or line. The user can manually select one of the user states from the displayed list of user states. When the user selects a user state, the client application can publish the specified user state in the user's shared presence document on the presence server. As displayed in subwindow 1302, it can be seen that the user, "Anders Madsen" has manually specified a user state of "Busy" by selecting its corresponding icon.

Subwindow 1302 also displays a list of commands 1308. The commands allow the user to reset a previously specified user state as indicated by the command "Reset Status," specify a note as indicated by the command "Set Note," and clear a preciously specified note as indicated by the command "Clear Note." Selecting one or more of the commands may cause another subwindow to appear through which the user can continue to execute the command. For example, when the user selects the Set Note command, a subwindow may appear through which the user can enter the note (e.g., text string).

Figure 14:
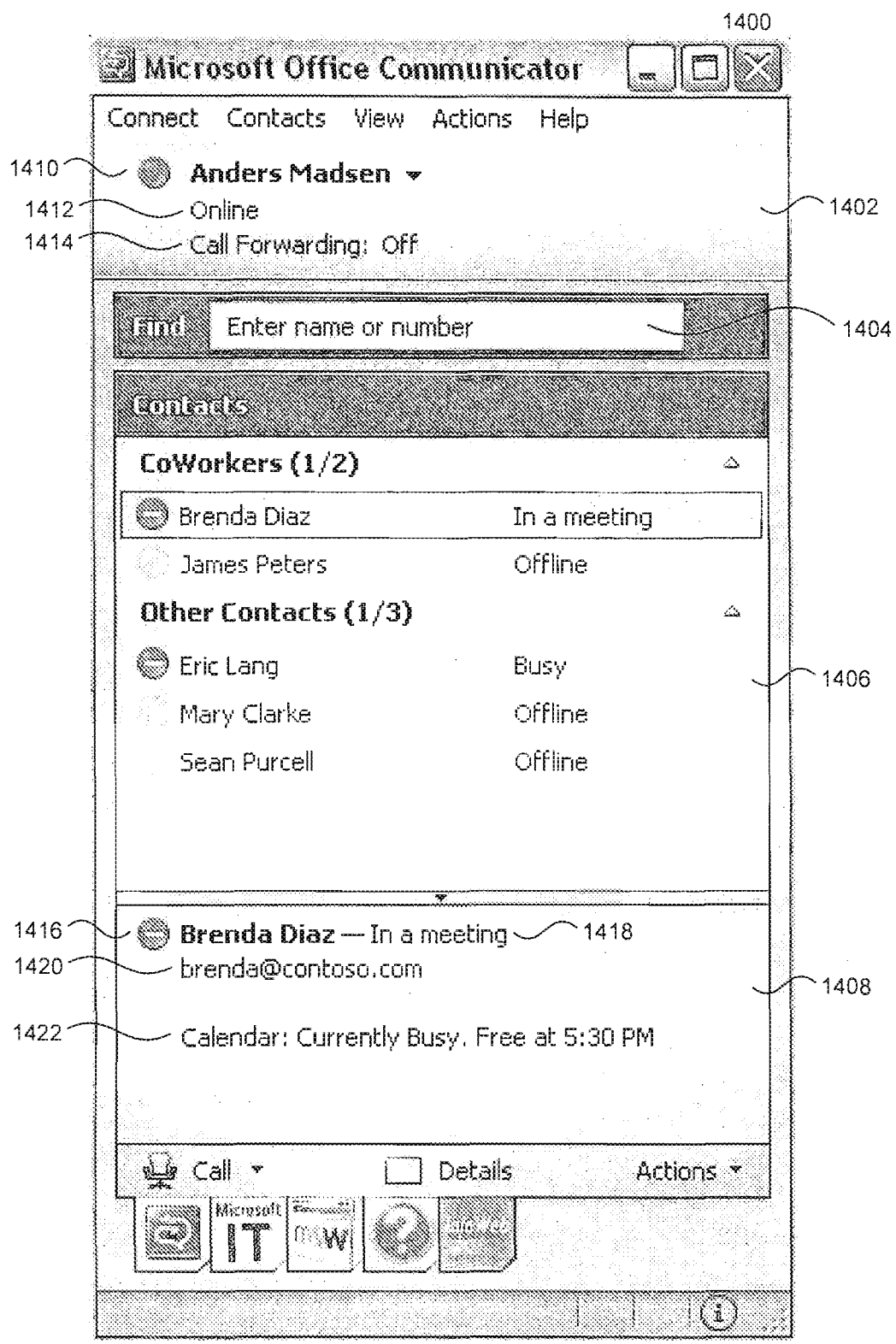
FIG. 14 is a display diagram showing a sample user interface displaying a view of a user's aggregated availability, according to some embodiments.

FIG. 14 is a display diagram showing a sample user interface displaying a view of a user's aggregated availability, according to some embodiments. User interface 1400 comprises a user pane or section 1402, a text entry box 1404, a contacts display area 1406, and an extended viewing pane or section 1408. The user section displays a view of the user's aggregated availability and any additional notes specified by the user. As displayed in user section 1402, the current aggregated availability of user "Anders Madsen" is "Online" as indicated by the displayed icon 1410 and default text string 1412. The user section also displays a text string 1414 indicating that Anders Madsen's call forwarding feature is currently set to off. For example, the user's shared presence document may have included an indication for the aggregation module to retrieve information from a specified phone or $3^{rd}$ party call control (3PCC) application for displaying as part of the user's view. In this case, the aggregation module may have determined from the specified phone application that Anders Madsen's call forwarding feature is currently set to off and, as a result, displayed the text string "Call Forwarding: Off" as part of Anders Madsen's view.

The text entry box allows the user to input a name, or another form of identification, of a user or a contact in order to request additional information regarding the user or contact identified in the text entry box. For example, when the user enters a name of a contact, the client application can request the specified contact's shared presence document from the presence server. Upon receiving the specified contact's shared presence document, the aggregation module can generate the specified contact's view, including any notes that are contained in the contact's shared presence document, and display this information in the extended viewing section of the user interface. As displayed in extended viewing section 1408, Brenda Diaz is currently busy as indicated by the displayed icon 1416 and an extended state string 1418. For example, a calendaring application may have published a generic state, along with the extended state string, to indicate that Brenda Diaz is in a meeting. In this case, the extended state string is displayed instead of the default text string corresponding to the busy state. Extended viewing section 1408 also displays Brenda's email address as indicated by text string 1420. For example, Brenda Diaz may have included her email address into her shared presence document as a note. Moreover, as indicated by the display of a text string 1422, Brenda Diaz's shared presence document may have included an indication for the aggregation module to retrieve information from her calendar, which may be maintained in a calendar application, and display the information as additional information (e.g., additional generic information) such as, calendar information indicating, by way of example, free/busy status of the user. This information provides the viewer an indication of Brenda Diaz's future state (e.g., Brenda Diaz is currently busy, but will be free at 5:50 PM).

The contacts display area displays the user's contacts, and for each displayed contact, an icon that represents the contact's current aggregated availability and a text string that textually describes the current aggregated availability or activity. The information that is displayed for each contact provides an indication of the particular contact's willingness and availability to communicate. The displayed information provides the viewing user an indication of the availability of the contacts, as well as the communication capabilities of the contacts, which allows the user to try different modes of communication. For example, if a contact is shown to be busy and in a meeting, the viewing user can decide to communicate by sending the contact an email message rather than trying to call the contact. As displayed in contacts display area 1406, Anders Madsen is currently displaying multiple contact lists—e.g., a list of "CoWorkers" and a list of "Other Contacts." The display of the list of CoWorkers includes "Brenda Diaz" and "James Peters." The display of the list of Other Contacts includes "Eric Lang," "Mary Clark," and "Sean Purcell." Next to each of the persons displayed in the contacts display area is an icon indicating the person's current aggregated availability and a default text string or an extended state string that textually describes the person's current aggregated availability or activity. Moreover, the user may request additional information regarding the contact (e.g., person) by selecting the contact from the contacts display area.

Figure 15:
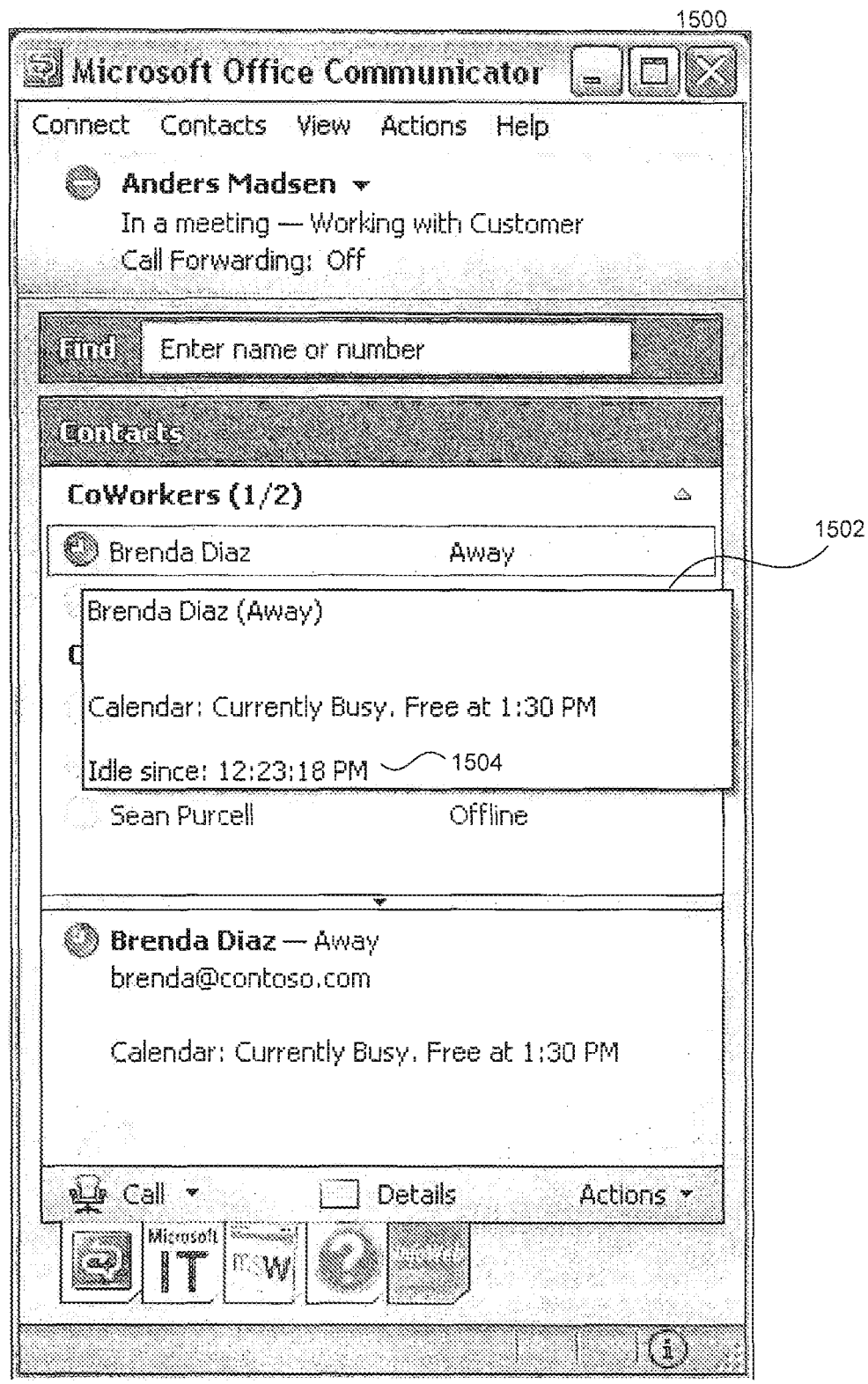
FIG. 15 is a display diagram showing a sample user interface displaying an indication of activeness of a contact, according to some embodiments.

FIG. 15 is a display diagram showing a sample user interface displaying an indication of activeness of a contact, according to some embodiments. User interface 1500 comprises a popup box 1502. The popup box may be a tool tip which is displayed when a cursor or pointer is positioned over the area of the user interface displaying a contact. The popup box displays an indication of activeness 1504 of the contact as part of the contact's view. For example, when a viewing user positions the pointer over a contact's name, the client application can retrieve the indication of activeness from the contact's shared presence document and display this information in the popup box. As displayed in the popup box, the indication of activeness indicates that Brenda Diaz was idle since 12:13:18 PM. From the displayed indication of activeness, the viewing user is able to determine how activeness the contact, Brenda Diaz. For example, the viewing user is able to determine that Brenda Diaz was idle (e.g., inactive) since the indicated time of 12:13:18 PM.

From the foregoing, it will be appreciated that specific embodiments of the presence aggregation system have been described herein for purposes of illustration, but that various modifications may be made without deviating from the spirit and scope of the invention. For example, one skilled in the art will appreciate that a module other than the aggregation module may generate a view of a user's aggregated availability and/or display the view of the user's aggregated availability. One skilled in the art will also appreciate that certain views may include more or less information than other views. For example, depending on various factors, such as the availability of a particular user, a view of one user may include more or less information than a view of another user. Accordingly, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-readable storage device storing computer-executable instructions for controlling a first computing device of a first endpoint of a publishing user to aggregate presence information across multiple endpoints of the publishing user, by a method comprising:

subscribing with a presence server to receive presence information of the publishing user;

sending from the first computing device notifications of presence information of the publishing user to the presence server;

receiving at the first computing device from the presence server presence information for the publishing user published by multiple endpoints of the publishing user; and after receiving from the presence server the presence information for the publishing user, generating at the first computing device an aggregated availability of the publishing user based on the received presence information that is published by multiple endpoints of the publishing user, the presence information including a user state and a device state, when the user state is the most recently published state of the publishing user, the aggregated availability is generated based on the user state and not based on device state and when a device state is the most recently published state of the publishing user, the aggregated availability is generated based on the most recently published user state of the publishing user and the device state published after the publication of the most recently published user state.

2. The computer-readable storage device of claim 1 wherein the presence server sends the presence information published by the multiple endpoints to a second computing device of a second endpoint of the publishing user.

3. The computer-readable storage device of claim 2 wherein the first computing device and the second computing device use a same aggregation logic to generate the aggregated availability of the publishing user.

4. The computer-readable storage device of claim 1 wherein the generating of the aggregated availability includes determining that the aggregated availability is a least available state across the multiple endpoints.

5. The computer-readable storage device of claim 1 wherein the user state is a state manually specified by the publishing user.

6. The computer-readable storage device of claim 5 wherein the publishing user identifies an application that is to provide a note associated with the manually specified user state.

7. The computer-readable storage device of claim 1 wherein when the received presence information does not include user state but includes device states and generic states, the generating of the aggregated availability is based on the least available state from among the most available of the device states and the generic states.

8. The computer-readable storage device of claim 1 wherein the presence server sends the presence information published by the endpoints of the publishing user to a second computing device of an endpoint other than an endpoint of the publishing user.

9. The computer-readable storage device of claim 8 wherein the first computing device and the second endpoint use a same aggregation logic to generate the aggregated availability of the publishing user.

10. A computing device of an endpoint of a publishing user for aggregating presence information across multiple endpoints of the publishing user, the computing device comprising:

a memory storing computer-executable instructions of:

a component that subscribes with a presence server to receive presence information of the publishing user;

a component that sends notifications of presence information of the publishing user to the presence server;

a component that receives from the presence server presence information published by multiple endpoints of the publishing user; and a component that, after receiving from the presence server the presence information for the publishing user, generates an aggregated availability of the publishing user based on the received presence information using aggregation logic that is the same as that used by another computing device of an other endpoint of the publishing user, the received presence information including a user state and device states, when the user state is the most recently published state of the publishing user, the aggregated availability is generated based on the user state and not based on device state and when a device state is the most recently published state of the publishing user, the aggregated availability is generated based on the most recently published user state of the publishing user and the device state published after the publication of the most recently published user state; and a processor that executes the computer-executable instructions stored in the memory.

11. The computing device of claim 10 wherein the presence server sends the presence information published by the multiple endpoints to the other computing device of the other endpoint of the publishing user.

12. The computing device of claim 10 wherein the user state is a state manually specified by the publishing user.

13. The computing device of claim 10 wherein when the received presence information does not include user state but includes device states and generic states, the component that generates the aggregated availability generates the aggregated availability based on the least available state from among the most available of the device states and the generic states.

14. The computing device of claim 10 wherein the presence server sends the presence information to a computing device of an endpoint other than an endpoint of the publishing user and that computing device of an endpoint other than an endpoint of the publishing user uses the same aggregation logic as the computing device of the endpoint of the publishing user to generate the aggregated availability of the publishing user.

15. A method performed by a computing device of an endpoint of a publishing user, the method comprising:

subscribing by the computing device with a presence server to receive presence information of the publishing user;

receiving from the presence server presence information published by multiple endpoints of the publishing user, the presence information including user state and device states; and after receiving from the presence server the presence information for the publishing user, generating by the computing device an aggregated availability of the publishing user based on the received presence information using aggregation logic that is the same as that used by another computing device of another endpoint of the publishing user such that when the user state is the most recently published state of the publishing user, the aggregated availability is generated based on the user state and not based on any device states and when a device state is the most recently published state of the publishing user, the aggregated availability is generated based on the most recently published user state of the publishing user and device states published after the publication of the most recently published user state.

16. The method of claim 15 wherein the presence server sends the presence information published by the multiple endpoints to the other computing device of the other endpoint of the publishing user.

* * * * *